Patented Apr. 10, 1951

2,548,336

UNITED STATES PATENT OFFICE 2,548,336

METHOD OF PRODUCING FISHING RODS AND THE LIKE

Fritz Bänninger, Zurich, Switzerland

No Drawing. Application October 26, 1945, Serial No. 624,657. In Switzerland October 31, 1944

1 Claim. (Cl. 144—309)

The present invention relates to a method of producing wooden rods of special properties for use as fishing rods, ski sticks, and the like.

More particularly the invention relates to a method in which crude rods are profiled to conform to their required shape and then subjected to treatment to make them more durable, capable of withstanding temperature variations and the influence of moisture and the invention further relates to a method of producing a rod which in spite of its inherent flexibility will not warp out of shape.

According to the invention a shaped rod of desired size is preliminarily heated for about fifteen minutes in a waterglass solution of at least 25°-30° Baumé. The treated rod is allowed to cool down in the solution, then removed and dried. This preliminary treatment or impregnation imparts a high degree of toughness to the rod. Following this treatment the rod is dried in vacuum at a temperature of about 90° centigrade in order to dehydrate the rod and free the same from air. Thereupon the rod in an air free condition is immersed in a spirit solution of a synthetic phenol-resin for about two or three days. The impregnated rod is then removed from the resin bath and dried in air. After the rod has been dried it is placed between jaws of a press mold which apply compression to the rod from two dimensions crosswise to the grain of the wood and subjected to pressure for about at least five to six hours at a temperature of at least 120° to 130° centigrade.

The resulting rod when removed from the press mold is very durable and flexible since with the pressing from two dimensions crosswise to the grain of the wood, a rod is produced that is evenly flexible in all directions and one that is particularly suitable for use as a fishing rod.

Having now described my invention, what I desire to claim is:

A method for the production of fishing rods and the like, comprising: heating a shaped wooden rod for about 15 minutes in about 25° to 30° Baumé waterglass; drying said rod; then exposing the dried rod to a temperature of about 90° C. in vacuum to dehydrate and void the same from air; then immersing the rod in a spirit solution of a synthetic phenol-resin for about two to three days; drying the rod and compressing it in a pressure mould crosswise to the grain of the wood from two dimensions for about 5 to 6 hours at about 120° to 130° C.

FRITZ BÄNNINGER.

REFERENCES CITED

The following references are of record in the file of this patent:

UNITED STATES PATENTS

| Number | Name | Date |
| --- | --- | --- |
| 55,216 | Ransome | May 29, 1866 |
| 1,022,064 | Curtis | Apr. 2, 1912 |
| 1,532,423 | Marshall | Apr. 7, 1925 |
| 1,834,895 | Brossman | Dec. 1, 1931 |
| 2,204,439 | Nicholson | June 11, 1940 |
| 2,232,416 | Taylor | Feb. 18, 1941 |
| 2,364,849 | Ibbotson | Dec. 12, 1944 |
| 2,370,033 | Hall | Feb. 20, 1945 |